(12) United States Patent
Van Liere (10) Patent No.: US 6,688,108 B1
(45) Date of Patent: Feb. 10, 2004

(54) POWER GENERATING SYSTEM COMPRISING A COMBUSTION UNIT THAT INCLUDES AN EXPLOSION ATOMIZING UNIT FOR COMBUSTING A LIQUID FUEL

(75) Inventor: Jacobus Van Liere, Doorwerth (NL)

(73) Assignee: N. V. Kema, Arnhem (NL)

( * ) Notice: Subject to any disclaimer, the term of this patent is extended or adjusted under 35 U.S.C. 154(b) by 0 days.

(21) Appl. No.: 09/914,145

(22) PCT Filed: Feb. 22, 2000

(86) PCT No.: PCT/NL00/00110

§ 371 (c)(1),
(2), (4) Date: Nov. 29, 2001

(87) PCT Pub. No.: WO00/50748

PCT Pub. Date: Aug. 3, 2000

(30) Foreign Application Priority Data

Feb. 24, 1999 (NL) .............................................. 1011383
Aug. 30, 1999 (NL) .............................................. 1012936

(51) Int. Cl.⁷ .............................. F02G 1/00; F02G 3/00
(52) U.S. Cl. .............................. 60/740; 60/737; 60/738
(58) Field of Search ........................... 60/740, 737, 738

(56) References Cited

U.S. PATENT DOCUMENTS

| | | | | |
|---|---|---|---|---|
| 3,668,869 A | * | 6/1972 | De Corso et al. | 60/740 |
| 3,763,650 A | * | 10/1973 | Hussey et al. | 60/39.463 |
| 4,045,956 A | | 9/1977 | Markowski et al. | 60/733 |
| 4,189,914 A | | 2/1980 | Marek et al. | 60/726 |
| 4,246,757 A | * | 1/1981 | Heberling | 60/737 |
| 4,522,183 A | | 6/1985 | Meier et al. | 123/558 |
| 4,596,210 A | | 6/1986 | Schmidtke | 123/1 A |
| 5,328,355 A | * | 7/1994 | Kobayashi et al. | 431/10 |
| 5,408,825 A | * | 4/1995 | Foss et al. | 60/463 |
| 5,461,865 A | * | 10/1995 | Snyder et al. | 60/737 |
| 5,713,205 A | * | 2/1998 | Sciocchetti et al. | 60/740 |
| 5,822,992 A | * | 10/1998 | Dean | 60/737 |
| 5,865,024 A | * | 2/1999 | Kress et al. | 60/463 |
| 5,884,471 A | * | 3/1999 | Anderson et al. | 60/39.23 |
| 6,070,410 A | * | 6/2000 | Dean | 60/737 |
| 6,174,160 B1 | * | 1/2001 | Lee et al. | 431/11 |
| 6,397,602 B2 | * | 6/2002 | Vandervort et al. | 60/737 |
| 6,434,945 B1 | * | 8/2002 | Mandai et al. | 60/740 |

FOREIGN PATENT DOCUMENTS

| | | | | |
|---|---|---|---|---|
| EP | 0506069 | | 9/1992 | C10L/1/00 |
| EP | 0693623 | | 1/1996 | F02M/53/06 |
| EP | 0790395 | | 8/1997 | F02B/51/00 |

* cited by examiner

Primary Examiner—Justine R. Yu
Assistant Examiner—William H. Rodriguez
(74) Attorney, Agent, or Firm—Webb Ziesenheim Logsdon Orkin & Hanson, P.C.

(57) ABSTRACT

The invention relates to a combustion unit for combusting a liquid fuel. The combustion unit has a fuel inlet, an air inlet and a flue gas outlet which are connected to a combustion chamber for combusting the fuel, wherein the fuel inlet is connected to at least one explosion atomizing unit which is disposed and adapted such that atomized fuel fragments due to gas formation in the atomized fuel. The explosion atomizing unit is preferably an explosion swirl atomizing unit to a system for generating power having at least one gas turbine, at least one compression device driven by the gas turbine and at least one such combustion unit.

11 Claims, 5 Drawing Sheets

POWER GENERATING SYSTEM COMPRISING A COMBUSTION UNIT THAT INCLUDES AN EXPLOSION ATOMIZING UNIT FOR COMBUSTING A LIQUID FUEL

BACKGROUND OF THE INVENTION (1) Field of the Invention (2) Description of the Prior Art The present invention relates to a combustion unit for combusting a liquid fuel and to a system for generating power comprising such a combustion unit.

In the combustion of liquid fuel, in particular engine fuels such as petrol, kerosine, diesel and methanol, it is important that at the time of the combustion the fuel is present in the smallest possible particles. The smaller the fuel particles, the more homogeneous a combustion results. A more homogeneous combustion is associated with less soot formation and soot emission as well as less CO formation and emission.

SUMMARY OF THE INVENTION

It is therefore the object to introduce the smallest possible fuel droplets into the combustion chamber. Known combustion units are characterized by assorted additional means for obtaining the smallest possible fuel droplets in the combustion chamber at the moment of combustion.

The present invention has for its object to provide a combustion unit for combusting liquid fuel which is provided with means for carrying into the combustion chamber very small liquid fuel particles (median size <5 $\mu$m, generally <3 $\mu$m, preferably <2 $\mu$m, such as 1.2 $\mu$m). Thus, a sufficient supply of these very small liquid fuel particles can be ensured and the means for obtaining these very small liquid fuel particles have a relatively simple construction and can be added in relatively simple manner to existing combustion units.

This is achieved according to the invention with a combustion unit for combusting a liquid fuel, comprising a fuel inlet, an air inlet and a flue gas outlet which are connected to a combustion chamber for combusting the fuel, wherein the fuel inlet is connected to at least one explosion atomizing unit which is disposed and adapted such that atomized fuel fragments due to gas formation in the atomized fuel.

The means for realizing these very small liquid fuel particles consist of explosion atomizing units.

All known types of atomizer can in principle be used in the explosion atomizing unit. Swirl atomizers, slot atomizers, hole atomizers, rotating plate or bowl atomizers and optionally pen atomizers are for instance suitable. All that is important is that the atomizer generates droplets or a film of liquid fuel to the gaseous medium under changed conditions such that explosion atomizing then occurs. Explosion atomizing entails the liquid fuel entering the combustion chamber under conditions such that as a result of the pressure drop over the atomizer boiling or gas bubbles occur in the droplets or film of the liquid fuel. That is, gas formation occurs in the liquid fuel. This so-called flashing or precipitation results in the droplets or film of fuel exploding or fragmenting due to the sudden partial boiling or gas precipitation. This fragmentation results in very small droplets of fuel being generated in the gaseous medium. The median dimension of fuel particles amounts after fragmentation to less than 5 $\mu$m, generally less than 3 $\mu$m, preferably less than 2 $\mu$m, for instance 1.2 $\mu$m.

It is noted that the explosion atomizing unit does not have to deliver the atomized liquid fuel directly into the combustion chamber. It is sufficient that the generated fuel droplets finally enter the combustion chamber without an undesirably large droplet growth having taken place as a consequence of coalescence.

The invention allows the use in the atomizing means of all types of atomizers insofar as these can result in particles with said median size after fragmentation. It is important in this respect that the explosion atomizing units are disposed and adapted such that the atomized fuel fragments through gas formation in the atomized fuel.

Use is preferably made of an explosion swirl atomizing unit which is provided with swirl atomizers. In such a known swirl atomizer a swirling movement is imparted to the liquid fuel in a swirl chamber. The swirling fuel exits from an outlet opening. It has been found that the thickness of the exiting layer of fuel is a fraction (for instance 10%) of the diameter of the outlet passage. Due to the subsequent explosion fragmentation, particles are obtained (depending on the pressure drop, temperature and passage diameter) with a median dimension of 5 $\mu$m or smaller.

It will be apparent that in order to realize this fragmentation it is important that the conditions (and particularly change in conditions) under which the liquid fuel is atomized are optimal for fragmentation. Important conditions for flash-fragmentation are the temperature of the fuel, the atomizing pressure under which the fuel is atomized, the pressure drop during exit and the passage diameter. It is therefore recommended that the explosion atomizing unit comprises means for adjusting the temperature of the evaporating agent and/or the atomizing pressure.

In the case of retrofit of the above stated combustion unit, it is possible to integrate a configuration of a number of explosion atomizing units into a new or modified air inlet, or to have these explosion atomizing units debouch directly into the combustion chamber. By orienting the outlet passage of each explosion atomizing unit it is possible to atomize the fuel such that it is optimal for the forming of the mixture of fuel and air for combustion. Particularly recommended are swirl atomizers and slot or hole atomizers since these have a very simple construction, can be readily miniaturized and built into existing combustion units. Very large numbers of explosion atomizing units can thus be incorporated without too many modifications of an existing combustion unit, which offers great freedom in the choice of fuel flow rate to the combustion chamber. Retrofit of existing combustion units thus results in combustion units which can be converted at lower cost and which nevertheless realize a greatly improved combustion with a lower soot and $NO_x$ emission.

As stated, liquid fuel can be applied as fuel. The liquid state herein refers to the state of the fuel at the temperature and pressure prevailing in the fuel inlet. This means that fuels can be used which are gaseous in ambient conditions. Fuels such as diesel and petrol have a boiling range. This means that in order to realize the explosion atomizing a temperature must be chosen from the boiling range such that a significant flash effect occurs. For diesel oil a temperature can be chosen of 350° C. For kerosine/petrol a lower fuel temperature can be chosen (250/150° C.). A higher fuel temperature, such as 400° C., can be chosen for low-speed marine diesel engines. It is noted however that these temperatures can vary depending on the pressure applied and optional fuel additives which have a positive effect on the explosion atomizing. It will be apparent that in order to realize an optimal explosion atomizing a combustion unit will preferably be equipped with means for adjusting the temperature and the atomizing pressure of the fuel.

If in further preference the temperature-adjusting means adjust the temperature of the evaporating agent around or to the critical temperature, the evaporating agent acquires a surface tension of practically or equal to 0 N/m$^2$. This means that no further or little atomizing energy is required to atomize the liquid, whereby the droplet size will become extremely small (a median droplet dimension to 0.1 $\mu$m is possible here) and the use of other agents to decrease the surface tension can optionally be dispensed with.

In addition to said physical conditions for fragmentation, it is also possible to enhance fragmentation by chemical or physical additives to the fuel. It is therefore recommended to add agents to the fuel which reduce the surface tension of the fuel and thereby decrease the energy required for fragmentation. Detergents and the like can be used as surface tension-reducing agents. Preferred are those surface tension-reducing agents which do not remain only on the surface of the fuel droplet but which are distributed almost homogeneously through the fuel (droplet or film). It is thereby not required that, after atomizing and prior to fragmentation, the surface tension be reduced to a lesser extent as a result of diffusion. In these conditions it is recommended to use fatty acids, particularly shorter fatty acids and optionally alcohols such as methanol and ethanol. These latter agents are particularly recommended because of a relatively low boiling point and good combustion. Thus is avoided that the combustion process is affected in a negative sense by these additives.

According to another embodiment the fuel contains combustible and/or vaporizable substances which either reduce the surface tension of the fuel or enhance the gas formation in the fuel as a result of the pressure drop over the atomizer. Combustible and/or vaporizable substances can particularly be used here which have a boiling point lower than the boiling point of the fuel. This should be understood to mean that in the case of a boiling range of the fuel, and optionally of the evaporating agent, these ranges are chosen such that the evaporating agent makes an essential contribution to the gas formation and ultimately the fragmentation of the fuel. When a number or mixture of evaporating agents are used, the vaporizable substances with the lowest boiling point will suddenly evaporate first and form boiling bubbles due to the pressure drop when passing through the explosion atomizing unit, whereby liquid fuel explodes or fragments into small droplets. A mixture can for instance be used of diesel oil as fuel and water as evaporating agent. Superheated evaporating agent (water) can also be used as evaporating agent (for instance water) and can be applied particularly in oil-fired boilers for generating steam. In which case fuel and superheated water can also be introduced separately into the boiler by explosion atomizing. The additional advantage is realized here that through the evaporation of the water the temperature of the mixture is lower prior to combustion, during combustion and after combustion, which enhances the performance of the combustion unit and reduces the emission of CO and NO$_x$.

The combustion unit can be applied in a combustion engine, for instance a gas engine, petrol engine or diesel engine. In addition, the combustion unit can be incorporated in a system for generating power which comprises a compression device driven by a gas turbine and the combustion unit according to the invention in which fuel and air compressed by the compression device are combusted and fed to the gas turbine.

It will be apparent that it is very advantageous in this respect if explosion atomizing units are used in the compression device to atomize determined evaporating agents with a comparably higher evaporation energy (for instance water). A quasi-isothermal compression is hereby obtained whereby the compression work is reduced considerably. In the case the combustion unit is provided with a compression chamber and a combustion chamber, the explosion atomizing unit for the fuel can be connected to the combustion chamber and an explosion atomizing unit for evaporating agent for the purpose of evaporation cooling can be connected to the compression chamber.

During the compression stroke and the firing stroke of the combustion engine an optional quasi-isothermal compression, and in any case an optimal combustion, can thus take place. It is further recommended in the case of evaporation cooling that between a compression chamber and a combustion chamber of the combustion engine at least one pressure vessel is received which is in heat-exchanging contact with a combustion gas outlet of the combustion engine. It is thus possible in the cool compressed air to recuperate heat from the heat of the flue gases. If the residence time in the pressure vessel is too short, a number of pressure vessels can be applied in parallel or a relatively large pressure vessel in combination with a number of combustion chambers.

Mentioned and other features of the combustion unit and the power-generating system according to the invention will be further elucidated hereinbelow with reference to a number of embodiments which are given by way of example without the invention having to be deemed limited thereto.

DETAILED DESCRIPTION OF THE INVENTION

Figures 1, 2:
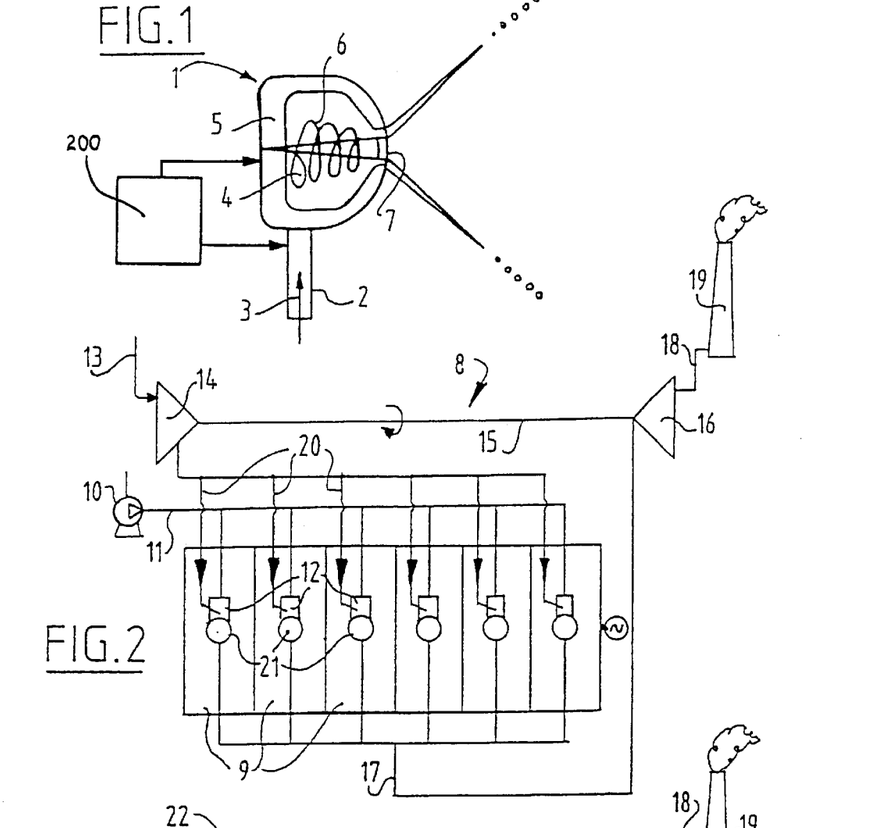
FIG. 1 shows a schematic view of an explosion swirl atomizer.
FIG. 2 shows a schematic representation of a diesel engine according to the invention with turbo-charger.

FIG. 1 shows an explosion swirl atomizer 1 such as is applied in a combustion unit according to the invention. The explosion swirl atomizer I comprises a line 2 with which fuel 3 (and/or optional evaporating agent) is fed via a tangential opening 4 to a swirl chamber 5. The liquid acquires a swirling movement 6 in swirl chamber 5 and leaves atomizer 1 via an outlet opening (or passage). The swirling fuel exits in the form of a cone. The thickness of the layer of fuel herein decreases and as a consequence of fragmentation breaks up into very small droplets. It can clearly be seen that the thickness of the layer of fuel is smaller than the diameter of outlet opening 7 of swirl chamber 5 when the exiting liquid exhibits flashed or gas precipitation through sudden pressure decrease, the cone and the particles then fragment into extremely small droplets, the so-called explosion atomizing. The thickness of the cone layer and the size of the formed droplet depends on the degree of explosion atomizing, and thus on the degree of gas formation in the cone layer. The physical conditions which are important herefor are the pressure and the temperature of the fuel and the prevailing pressure and temperature in the space into which the swirling atomized fuel is delivered. It is thus possible to influence the number and size of the fonned atomized fuel particles by the choice of these conditions. The explosion atomizing unit 1 may also include a means for adjusting the temperature of the fuel 3 and/or the atomizing pressure. This means for adjusting 200 is illustrated in schematic form in FIG. 1.

FIG. 2 shows a diesel engine 8 according to the invention comprising six combustion units or cylinders 9 according to the invention. Diesel oil is supplied via a pump 10 and a line 11 to an explosion atomizing unit 12 which can consist of a suitable number of chosen explosion atomizers as shown in FIG. 1. The diesel oil has a temperature and pressure suitable for the explosion atomizing. Air is supplied via a line 13 to a compressor 14 which is driven by a gas turbine 16 via a shaft 15.

Added to gas turbine 16 is the flue gas from cylinders 9 which is fed via a line 17 to gas turbine 16 and via a line 18 to the chimney 19.

Air compressed in compressor 14 is fed via lines 20 to the combustion chamber 21 of each cylinder 9.

Figure 3:
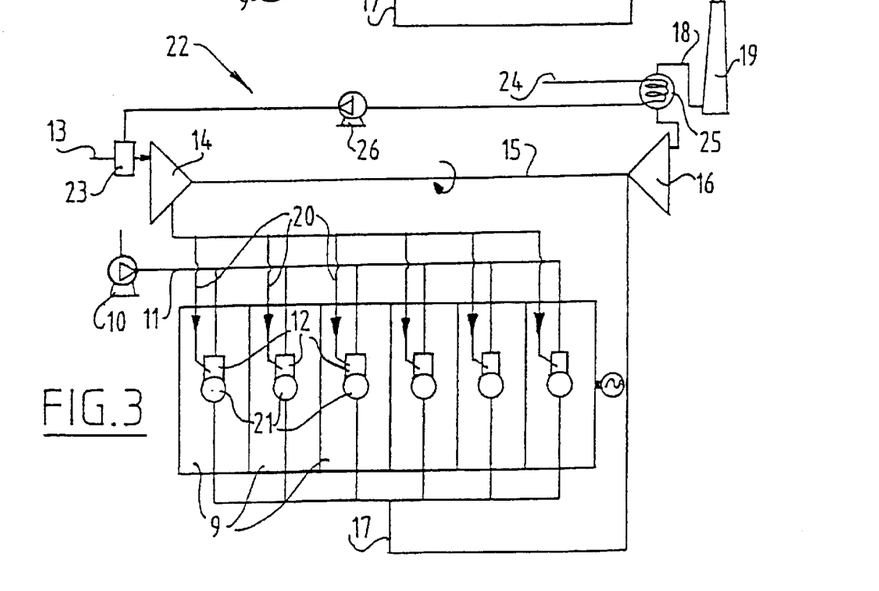
FIG. 3 shows a variant of the diesel engine of FIG. 2.

FIG. 3 shows a diesel engine 22 corresponding with FIG. 2. Corresponding components are designated with the same reference numerals. A first difference however is that the air compressed in compressor 14 is not fed via line 20 to combustion chamber 21 but to the explosion atomizing unit 12. This produces an optimum mix of fuel and air. If the air still contains evaporating agent particles (water particles), a quasi-isothermal compression is still even possible in cylinder 9.

Secondly, an explosion atomizing unit 23 is received in line 13. Through explosion atomizing water is supplied herein to the air, whereby a quasi-isothermal evaporation occurs in compressor 14. The water required is fed via a line 24 to a heat exchanger 25 in which it is in heat-exchanging contact with the flue gas leaving gas turbine 16. The heated water is fed under pressure via a pump 26 to explosion atomizing unit 23.

Diesel engines 8 and 22 shown in FIGS. 2 and 3 can be used as low-speed marine diesel engines.

Figure 4:
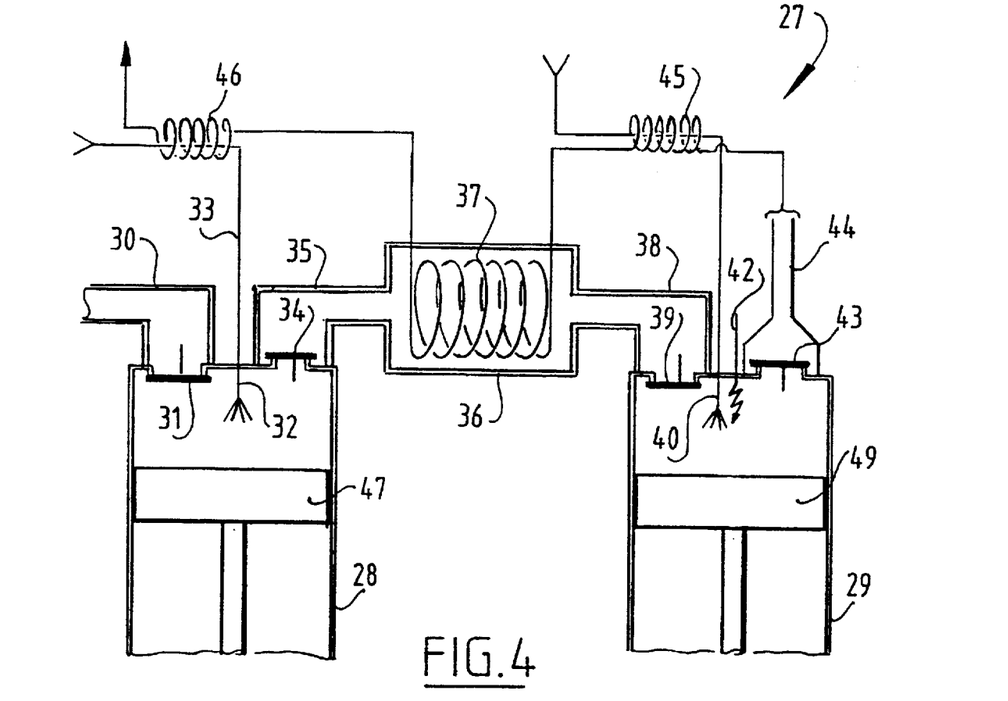
FIGS. 4–6 each show a schematic representation of a combustion engine according to the invention.

FIG. 4 shows a combustion engine 27 according to the invention which is provided with a compression chamber 28 and a combustion chamber 29. Compression chamber 28 is provided with an air inlet 30 with an inlet valve 31. Compression chamber 28 further comprises an explosion atomizing unit 32 for supplying coolant (for instance water) via line 33. Quasi-isothermal compression can thus be achieved by evaporation cooling. Via an outlet 35 provided with a valve 34 the compression chamber 28 is connected to a pressure vessel 36 which is provided with a heat exchanger 37. Pressure vessel 36 is connected via line 38 and a valve 39 to combustion chamber 29, which is further provided with an explosion atomizing unit 40 for fuel supplied via line 41 and an ignition unit 42. Via a valve 43 and an outlet 44 exhaust gases are discharged via heat exchangers 45, 37 and 46.

The operation of combustion engine 27 is as follows. At one bar and a temperature of 27° C. water is atomized via explosion atomizing unit 32 in compression chamber 28, wherein quasi-isothermal compression takes place to 44 bar and 220° C. Valves 34 and 39 open and pressure vessel 36 and combustion chamber 29 are filled during the latter part of the stroke of piston 47. Valves 34 and 39 then close. The air present in pressure vessel 36 is heated against the exhaust gases passing through heat exchanger 37. In pressure vessel 36 the air is heated to a temperature of 300° C. and finally flushed into combustion chamber 29 via valve 39.

Fuel is injected simultaneously via explosion atomizing unit 40, whereafter ignition and expansion then take place in combustion chamber 29. During the return stroke of piston 48 the exhaust gases are discharged via valve 43 and used for heat exchange with the fuel, the compressed air and the water for injecting.

It will be apparent that in combustion engine 29 fuel is likewise injected via explosion atomizing unit 40 and coolant via explosion atomizing unit 32.

The use of combustion engine 27 achieves that minimal compression work is performed, while the recuperation of low temperature heat is realized for preheating of air, water and/or fuel.

In the case the residence time in the pressure vessel is insufficient for an optimal heating of the compressed gas, it is recommended that the pressure vessel be embodied in the form of a number of pressure vessels connected in parallel between compression chamber 28 and combustion chamber 29.

If the quasi-isothermal compression is performed by injecting a mixture of water/fuel (for instance water/methanol), the evaporation cooling can then be supplemented by extraction of heat resulting from the cracking of the fuel. In order to perform this cracking reaction of the fuel it is necessary for a cracking catalyst to be incorporated in the pressure vessel (for instance CuO for methanol or zeolite for petrol). Important are an adequate reaction time in the order of one second and a sufficiently high cracking temperature for methanol of 250–300° C. and for petrol of 475–675° C.

It will be apparent that by arranging a separation between the compression chamber and the, combustion/expansion chamber using the pressure vessel, an optimization of the energy efficiency can be realized in conditions of variable power requirement by making use of the accumulated energy. A hybrid motor with compressed air storage can optionally even be applied.

Figure 5:
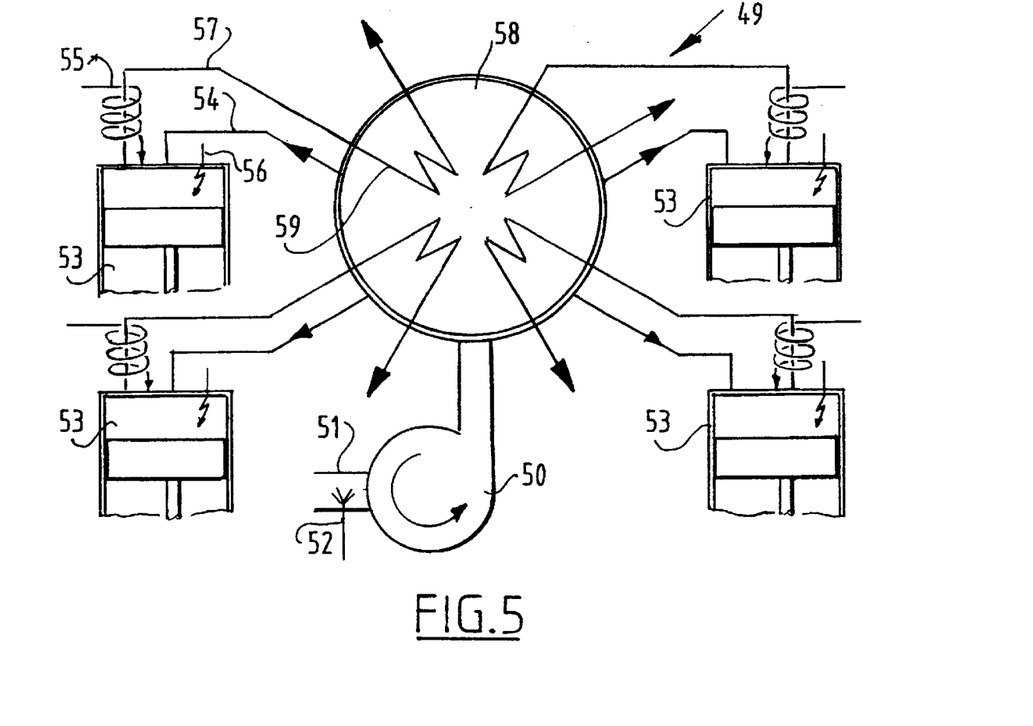

FIG. 5 shows a combustion unit 49 according to the invention.

Via the rotating compressor 50 air is supplied via inlet 51, while a water/fuel mixture is atomized with an explosion atomizing unit 52. Connected to pressure vessel 58 are combustion chambers 53 which each take in the compressed mixture of air/fuel via a line 54, while additional fuel is supplied via inlet 55. The mixture is ignited using ignition 56. Exhaust gases leave combustion chamber 53 via outlet 57. Using a heat exchanger 59 heat-exchange takes place with the mixture of air/fuel present in pressure vessel 58. By making use of the large pressure vessel 58 and a plurality of combustion chambers there is significantly more time for heating of the mixture present in pressure vessel 58 using the exhaust gases.

Figure 6:
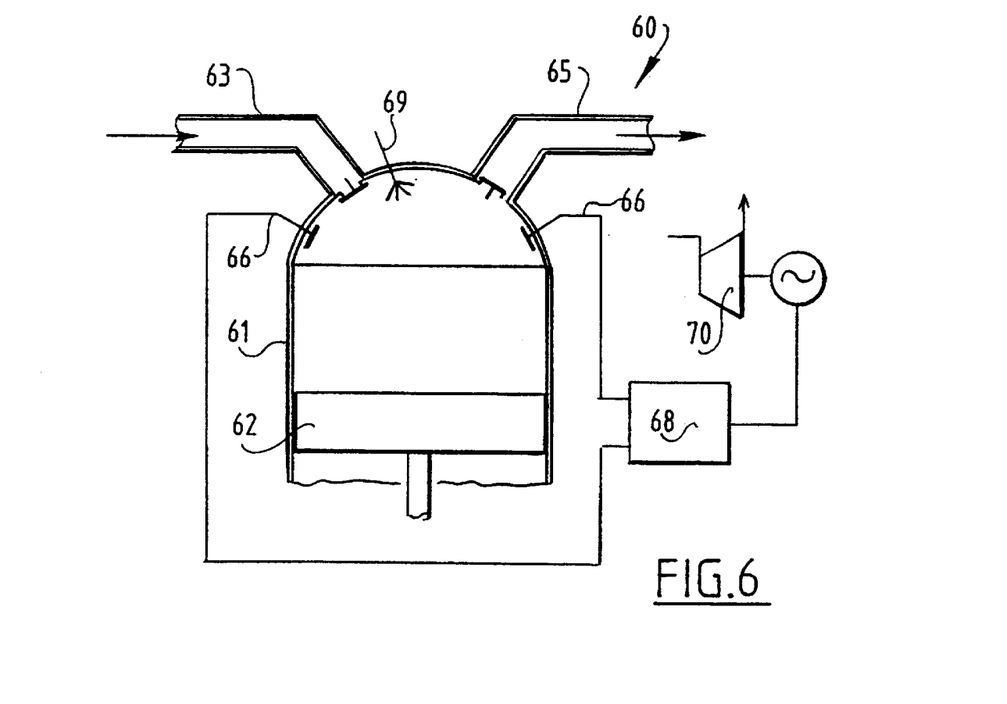

FIG. 6 shows a combustion engine 60 comprising a cylinder 61 with a piston 62 in addition to an air inlet 63 and a flue gas outlet 65. Cylinder 61 is further provided with plasma electrodes 66 which are connected to power electronics 68 for generating a plasma in the head of cylinder 61. During the compression a fuel/water mixture is fed via the explosion atomizing unit 69, not shown in detail, for the quasi-isothermal compression. The plasma arc is subsequently generated to heat the compressed air and the ignition of the fuel mixture, and after the expansion stroke of piston 62 the flue gases are expelled via outlet 65 and drive the turbine 70 while generating power which is used partially by the power electronics.

Figure 7:
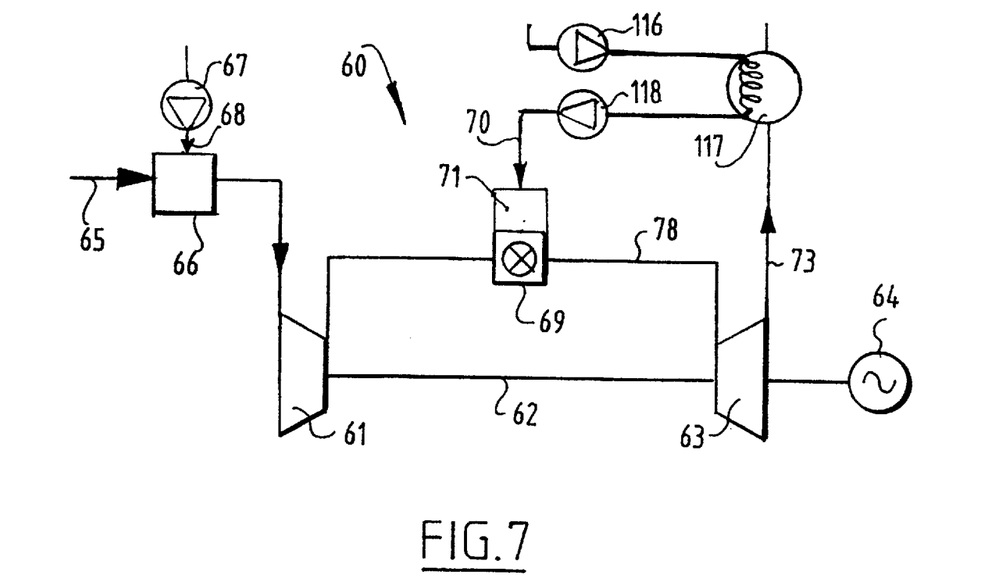
FIG. 7 shows a schematic representation of a power-generating system according to the invention.

FIG. 7 shows a system 60 for generating power. System 60 comprises a compressor 61 which is driven via a shaft 62 by gas turbine 63 which in turn drives a generator 64.

Air is supplied to compressor 61 via a line 65 and water is supplied in an explosion atomizing unit 66 via the line 68 provided with a pump 67. The air compressed in compressor 61 is fed to a combustion unit 69 according to the invention, to which via a line 70 preheated fuel is supplied at pressure via pump 116, heat exchanger 117 and pump 118 and atomized in an explosion atomizing unit 71 before being fed to combustion unit 69. The fuel is brought to pressure with pump 116 and preheated via heat-exchange against the flue gas from line 73 in heat exchanger 117, and brought to or above the critical temperature or, in the case of a boiling range for the fuel, within the range of critical temperatures of the fuel components. Via line 72 flue gas is fed to turbine 63 and after expansion discharged via line 73.

Figure 8:
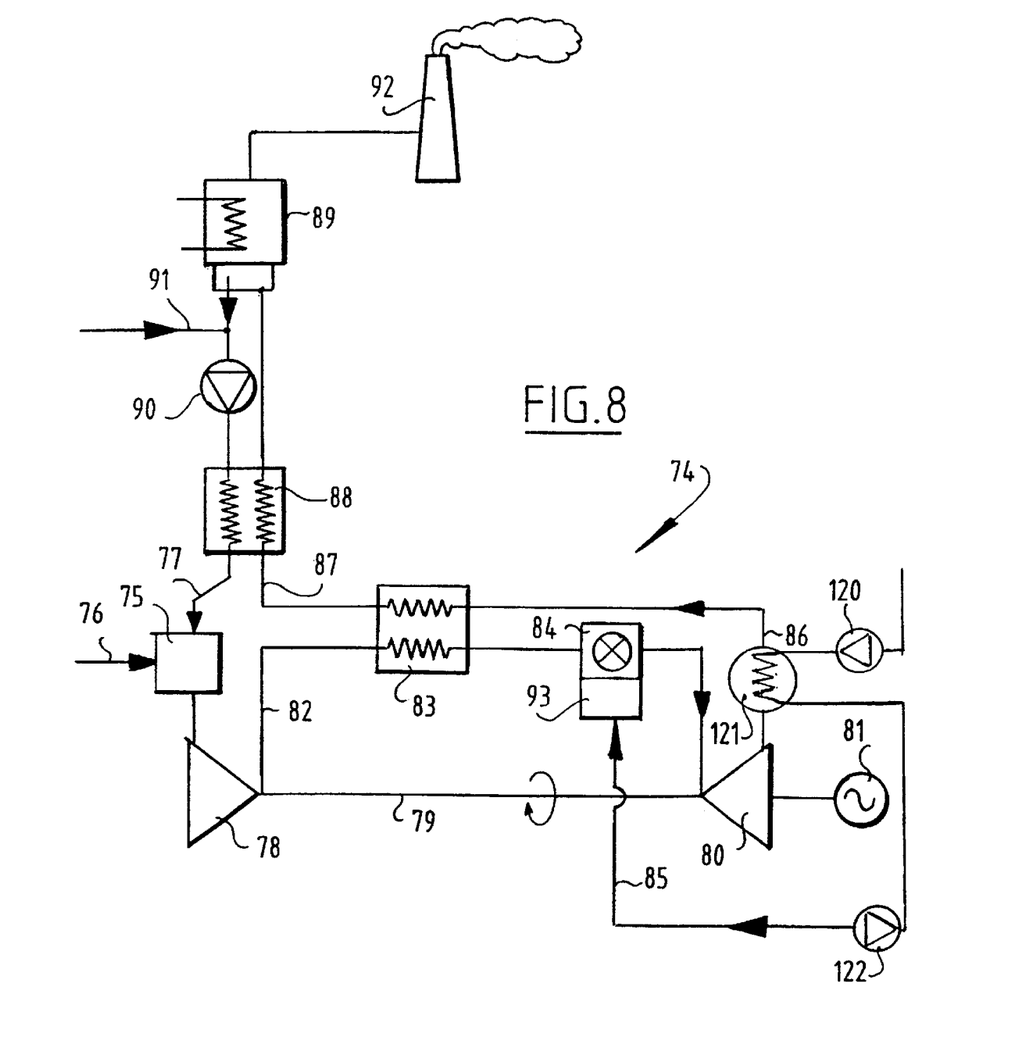
FIG. 8 shows another power-generating system according to the invention according to the TOPHAT principle (TOP humidified air turbine)

FIG. 8 shows another system 74 for generating power according to the invention in accordance with the so-called TOPHAT principle. In an explosion unit 75 air 74 is provided with water droplets with water 77 supplied by means of explosion atomizing. The air is supplied to a compressor 78 which is connected via a shaft 79 to a gas turbine 80 which drives a generator 81. Evaporation cooling of the water droplets takes place in compressor 78. The cool compressed air passes through a heat exchanger 83 via a line 82 and is fed to combustion unit 84. Fuel is preheated at pre-pressure via pump 120 in heat exchanger 121 and brought under pressure by pump 122 and after explosion atomizing in explosion atomizing unit 93 supplied via line 85 to combustion unit 84. The added fuel is at a pressure and temperature such that when it enters the combustion chamber of combustion unit 84 fuel-flash takes place, resulting in an extremely fine atomizing of the fuel. The flue gas from gas turbine 80 passes through heat exchanger 83 via line 86 for heat-exchanging contact with the cool compressed air from compressor 78. Via line 87 the flue gas passes through a heat exchanger 88 and condenser 87 on its way to chimney 92. In condenser 89 water is condensed out of the flue gas and guided under pressure via pump 90 through heat exchanger 88, whereafter the water 77 reaches explosion atomizing unit 75 under pressure and at temperature. The condensation water from condenser 89 can optionally be replenished with water via line 91.

Figure 9:
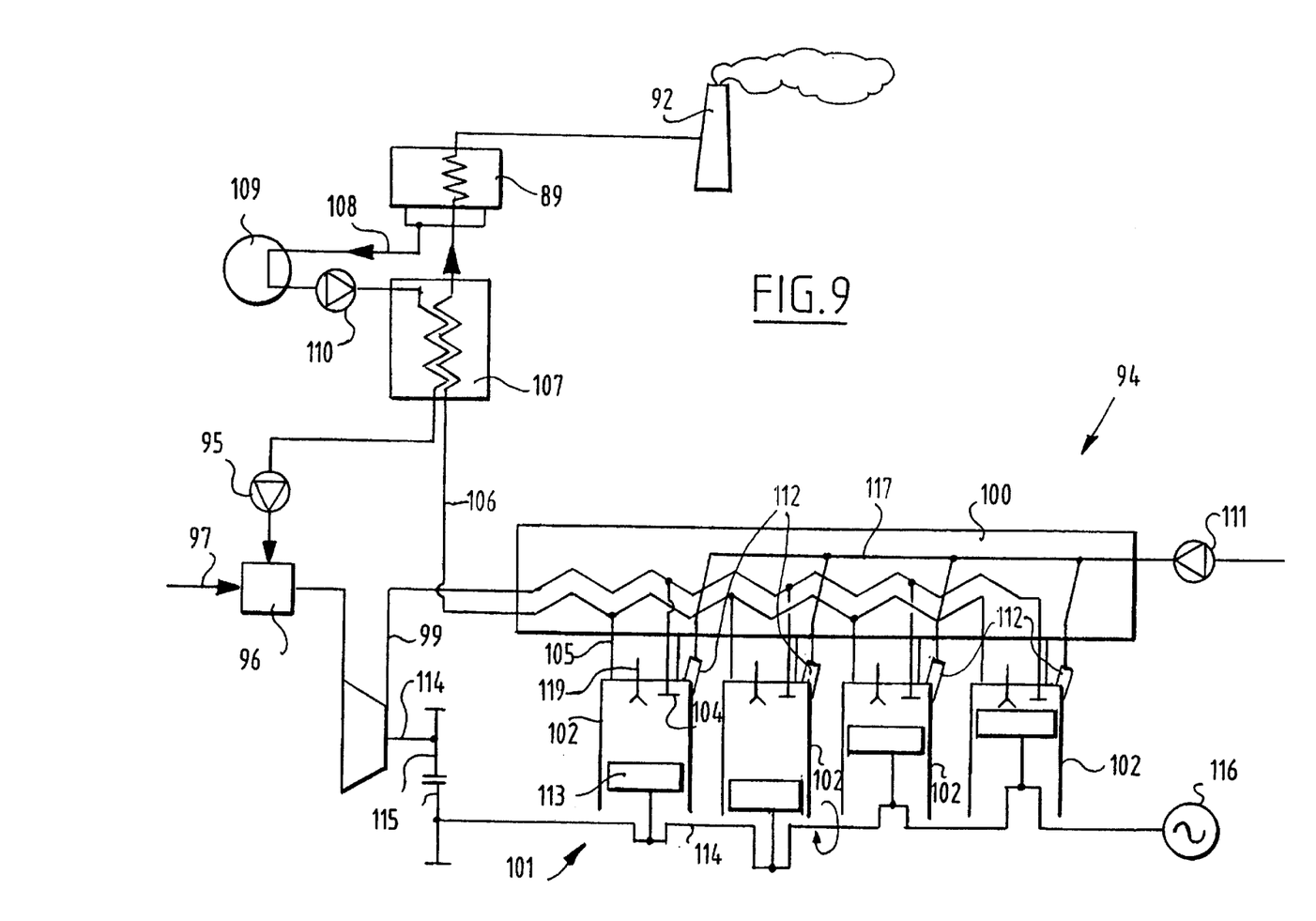
FIG. 9 shows another power-generating system according to the invention according to the TOPHACE principle (TOP humidified air combustion engine).

Finally, FIG. 9 shows a system 94 according to the invention for generating power in accordance with the TOPHACE principle.

Via a pump 95 water (140–250°C., 150 bar) is fed to an explosion atomizing unit 96 to which air is likewise fed via line 97 (15° C.). From the explosion atomizing unit 96 the air reaches a compressor 98 which operates at an efficiency of 0.8. The compressed air (140° C.) is fed via line 99 to a heat exchanger 100 for heat-exchanging contact with the flue gases of a combustion engine 101. This latter comprises four cylinders 102, an air inlet 103 of which connects to line 99 via a valve 104. A flue gas outlet 105 of each cylinder 102 passes through heat exchanger 100 and is carried via line 106 through a heat exchanger 107 and enters the chimney 92 via condenser 89. In condenser 89 is formed condensation 108 which after passing through a water cleaner 109 is brought to pre-pressure with pump 110 and fed via heat exchanger 107 to pump 95 and brought to pressure.

Fuel is fed to each cylinder 102 via pump 111, line 117 and explosion atomizing unit 112 and valves (not shown). The fuel is preheated to or beyond the critical temperature or, in the case of a boiling range, to within the range of critical temperatures, before being atomized with explosion atomizing unit 112.

In the recuperator 100 the air is heated from 140° C. to 377° C., while the flue gas from cylinders 102 re-cools from 465° C. to 210° C. The air is fed at a pressure of 9 bar to cylinders 102 and atomized fuel is injected. Cylinders 102 are also embodied with an igniter 119 for igniting the mixture in each cylinder 102. Cylinders 102 are each equipped with a piston 113, which are connected to a shaft 114 which is connected via a 1:5 gear system 115 to the shaft 114 of compressor 98 and on the other side to the generator 116.

Under ideal conditions the system 94 produces power of 226 kilowatts at an efficiency of 64%. A known apparatus according to the Atkinson principle produces a power of only 170 kilowatts at an efficiency of 48%.

What is claimed is:

1. A combustion unit for combusting a liquid fuel, comprising a fuel inlet, an air inlet and a fuel gas outlet which are connected to a combustion chamber for combusting the fuel, wherein the fuel inlet is connected to at least one explosion swirl atomizing unit and wherein the atomizing unit comprises means for adjusting the temperature of the fuel and/or the atomizing pressure such that as a result of a pressure drop swirling fuel exiting an outlet opening of the explosion swirl atomizing unit into the combustion chamber experiences explosion fragmentation fragments into fuel droplets having a median dimension of equal or less than 5 $\mu$m.

2. The combustion unit as claimed in claim 1, wherein the explosion atomizing unit is an explosion swirl atomizing unit.

3. The combustion unit as claimed in claim 1, wherein the temperature adjusting means are suitable for adjusting the temperature of the fuel below, at or above the boiling temperature of the fuel.

4. The combustion unit as claimed in claim 1, wherein the fuel is provided with agents for reducing the surface tension of the fuel.

5. The combustion unit as claimed in claim 4, wherein the surface tension-reducing agents contain combustible and/or vaporizable substances.

6. The combustion unit as claimed in claim 1, wherein the fuel is a mixture of fuel and an evaporating agent having a boiling point lower than the boiling point of the fuel.

7. The combustion unit as claimed in claim 6, wherein the evaporating agent is water.

8. The combustion unit as claimed in claim 1, wherein the explosion atomizing unit is accommodated in at least one of the combustion chamber and a compression chamber of the combustion unit.

9. The combustion unit as claimed in claim 8, wherein at least one pressure vessel in heat-exchanging contact with the flue gas outlet is arranged between the compression chamber and the combustion chamber.

10. The combustion unit as claimed in claim 9, wherein a catalyst for cracking fuel is arranged in the combustion chamber.

11. A system for generating power, comprising at least one gas turbine, at least one compression device driven by the gas turbine and at least one combustion unit wherein the combustion unit comprises a fuel inlet, an air inlet and a flue gas outlet which are connected to a combustion chamber for combusting the fuel, wherein the fuel inlet is connected to at least one explosion swirl atomizing unit and wherein the atomizing unit comprises means for adjusting the temperature of the fuel and/or the atomizing pressure such that as a result of a pressure drop swirling fuel exiting an outlet opening of the explosion swirl atomizing unit into the combustion chamber experiences explosion fragmentation fragments into fuel droplets having a median dimension of equal or less than 5 $\mu$m.

* * * * *

UNITED STATES PATENT AND TRADEMARK OFFICE
CERTIFICATE OF CORRECTION

| | |
|---|---|
| PATENT NO. | : 6,688,108 B1 |
| DATED | : February 10, 2004 |
| INVENTOR(S) | : Jacobus Van Liere et al. |

It is certified that error appears in the above-identified patent and that said Letters Patent is hereby corrected as shown below:

<u>Title page,</u>
Item [87], PCT Pub. Date, "Aug. 3, 2000" should read -- Aug. 31, 2000 --.
Item [75], Inventors, add -- Cornelis Adrianus Antonius Van Paassen, Den Hoorn (NL) --.
Item [30], Foreign Application Priority Data, add
-- PCT/NL99/00380   NL 6/18/99 --.

<u>Column 1,</u>
Line 9, delete "(2) Description of the Prior Art"
Before line 13, insert  (2) Description of the Prior Art --
Line 21, delete "SUMMARY OF THE INVENTION"
Before line 27, insert -- SUMMARY OF THE INVENTION --.

<u>Column 4,</u>
Line 54, "atomizer I" should read -- atomizer 1 --.

Signed and Sealed this

Twentieth Day of July, 2004

JON W. DUDAS
*Acting Director of the United States Patent and Trademark Office*